Dec. 7, 1943.  W. R. BECK  2,336,386
COAL MINE HAULAGE VEHICLE
Filed Aug. 26, 1942  5 Sheets-Sheet 2
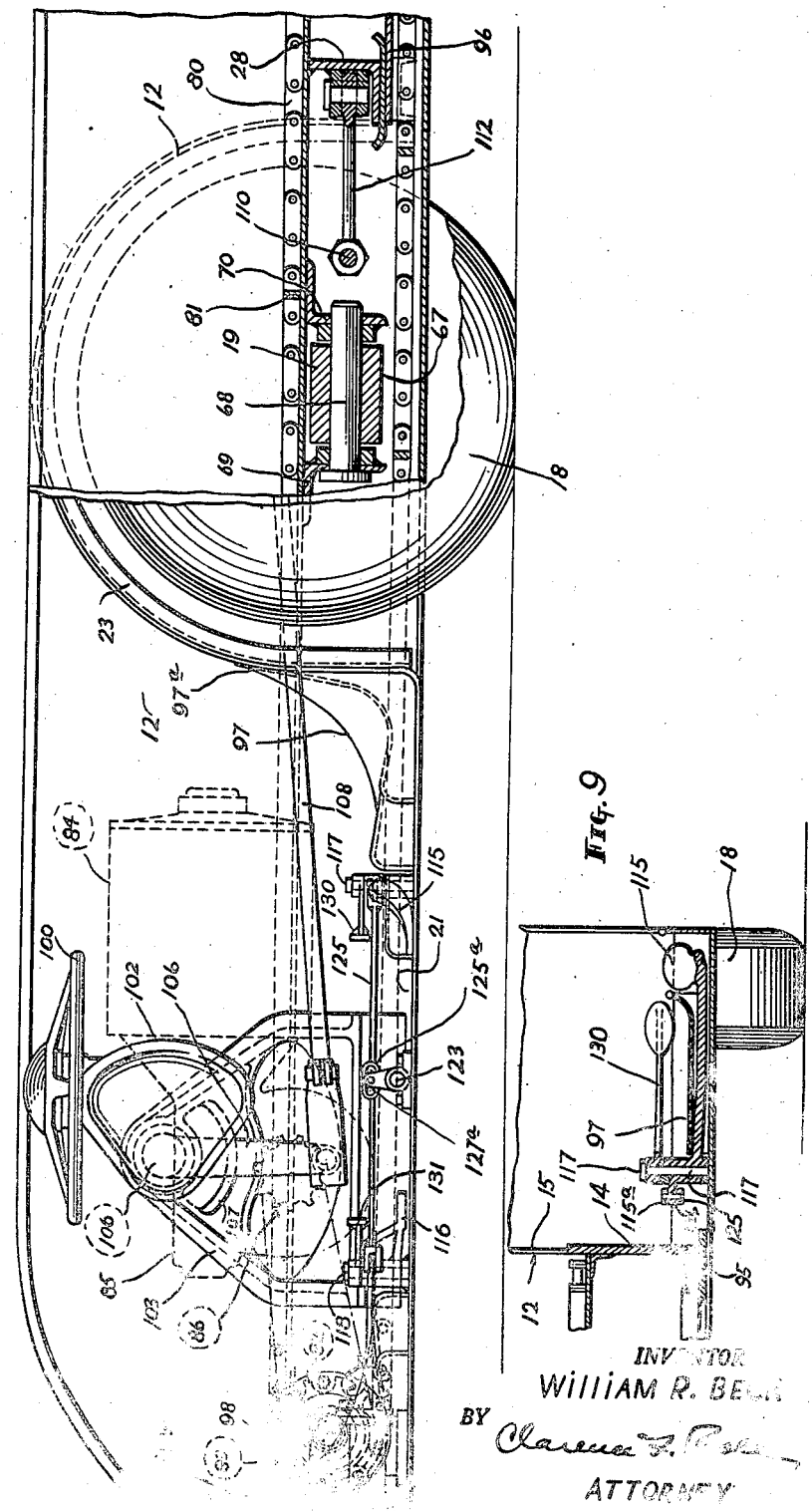

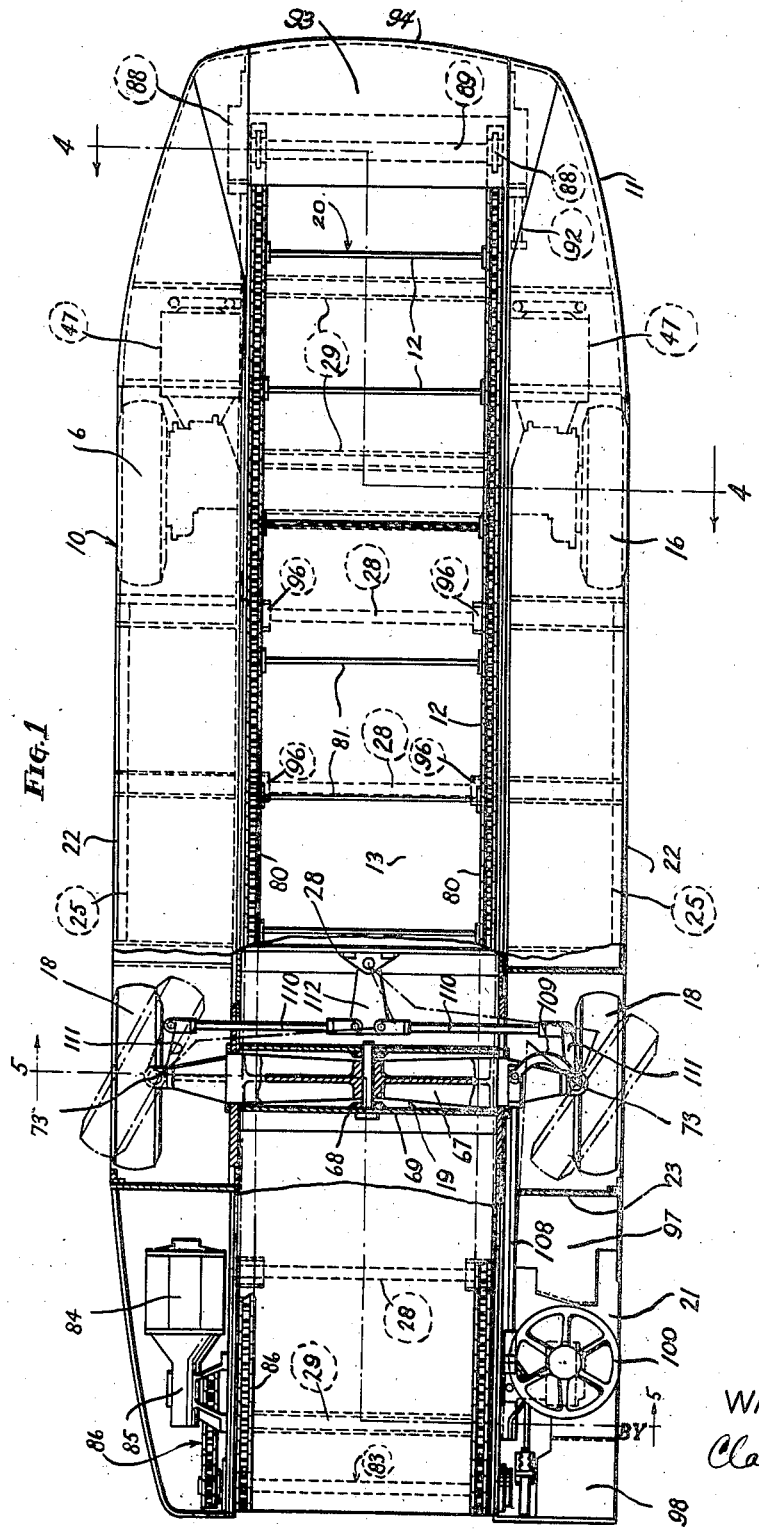

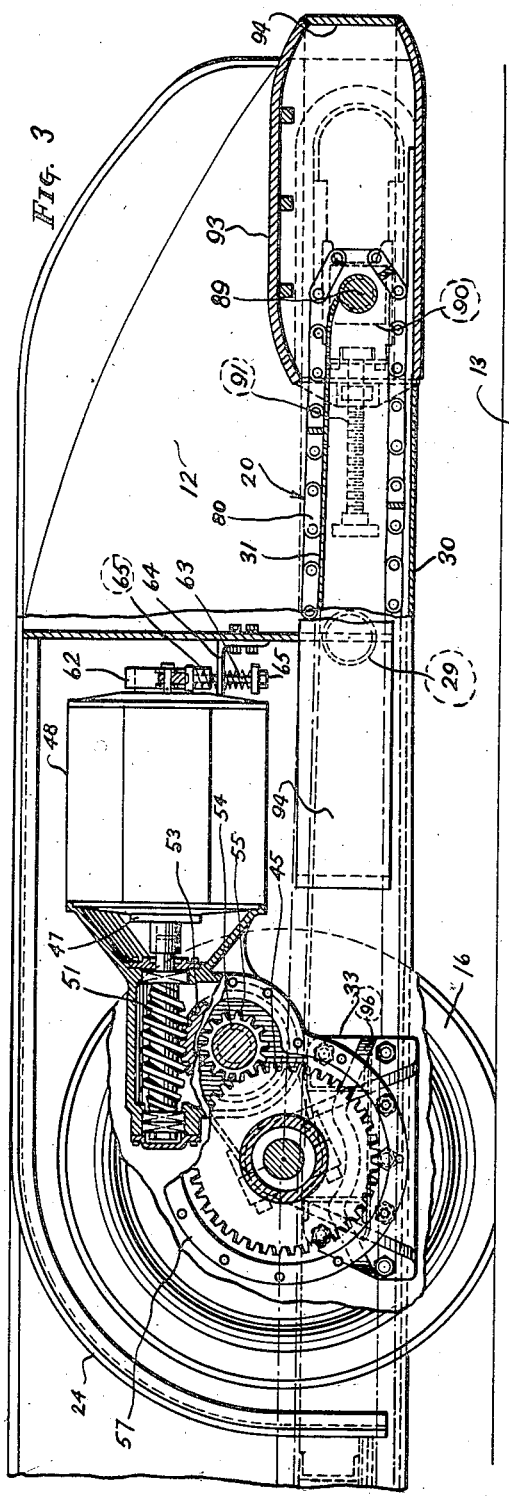

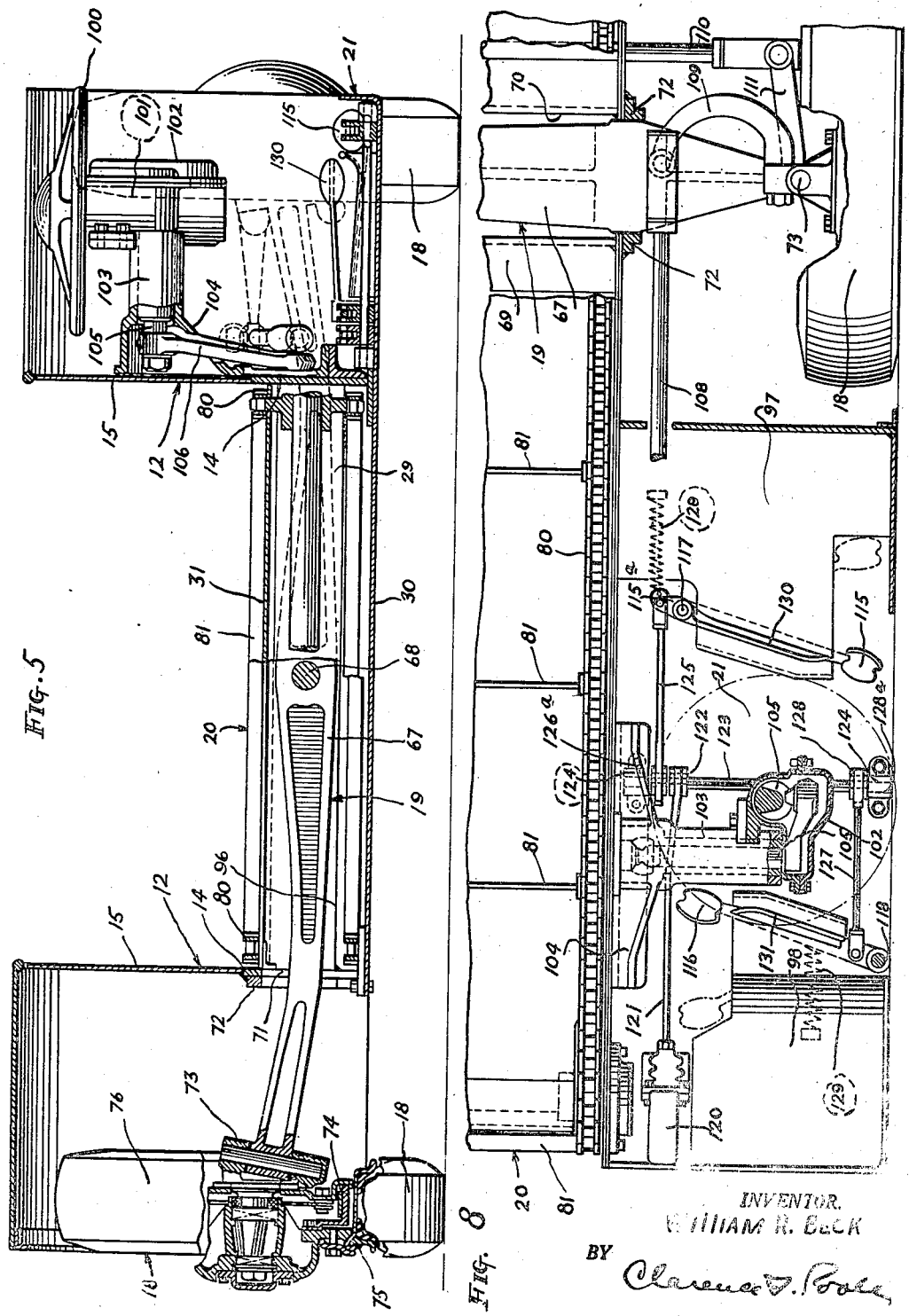

Dec. 7, 1943.  W. R. BECK  2,336,386
COAL MINE HAULAGE VEHICLE
Filed Aug. 26, 1942  5 Sheets-Sheet 5
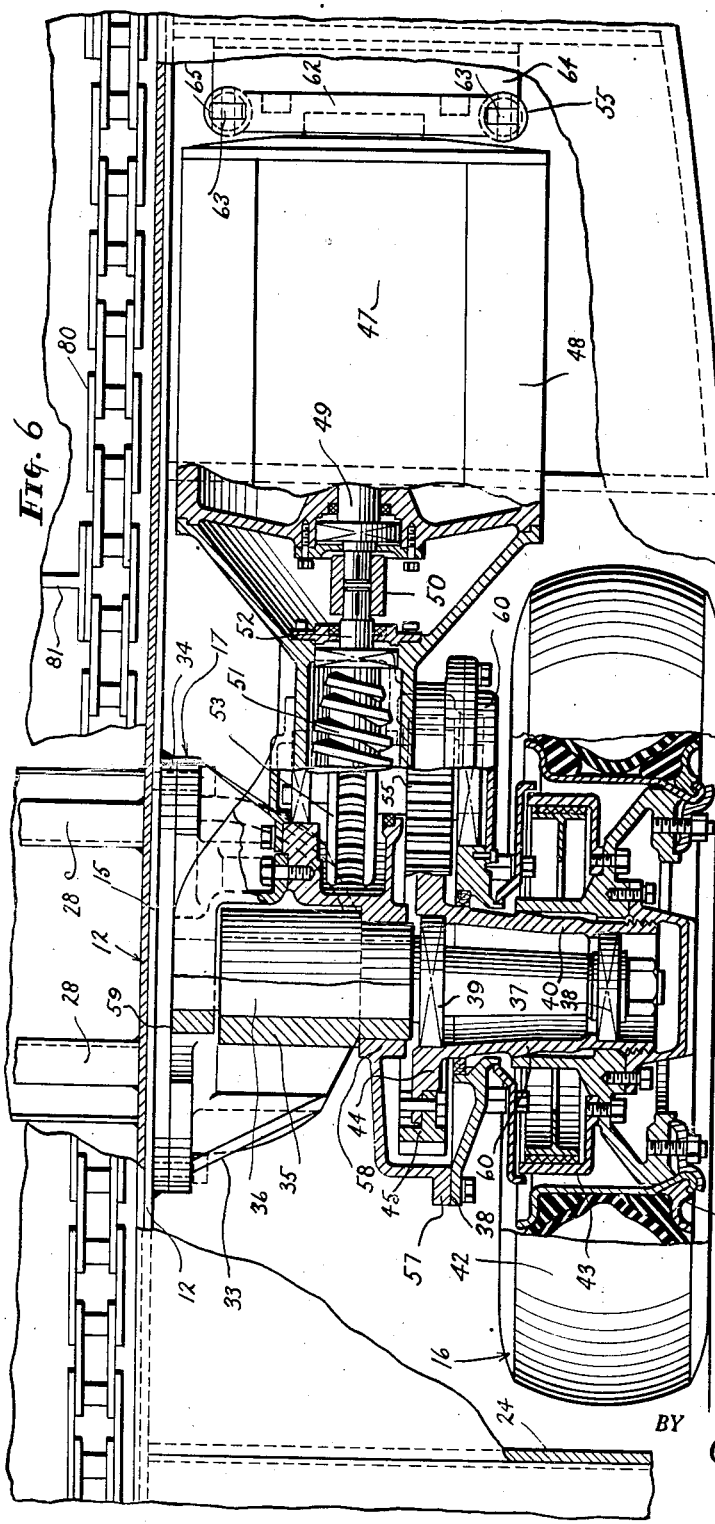
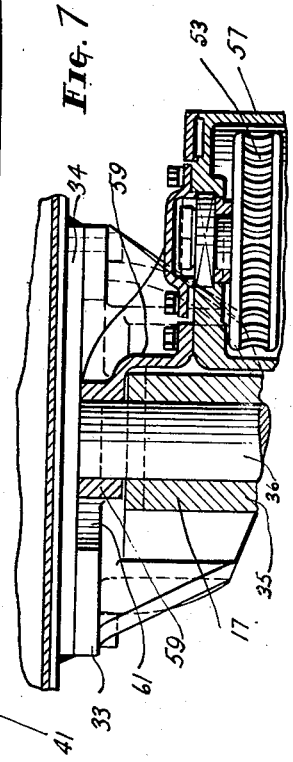
INVENTOR.
WILLIAM R. BECK
BY
Clarence F. Poole
ATTORNEY Patented Dec. 7, 1943

2,336,386

UNITED STATES PATENT OFFICE 2,336,386

COAL MINE HAULAGE VEHICLE

William R. Beck, Chicago, Ill., assignor to Goodman Manufacturing Company, Chicago, Ill., a corporation of Illinois Application August 26, 1942, Serial No. 456,165

2 Claims. (Cl. 214—83)

This invention relates to improvements in coal mine haulage vehicles, commonly known as shuttle cars or coal buggies, of the kind used for transporting coal from the working face to a main haulage station of a mine.

The objects of the invention are to provide an improved vehicle structure especially adapted for use in relatively low roof conditions; to provide safer accommodations for the operator in his control platform; to provide an improved axle supporting structure; and to provide improved drive means for such vehicles. Other objects of the invention will appear from the following description.

The invention may best be understood by reference to the accompanying drawings, in which:

Figure 1 is a top plan view of a vehicle constructed in accordance with my invention;

Figure 2 is an enlarged fragmentary view in side elevation of the front end of the vehicle, with a portion shown in longitudinal section;

Figure 3 is a fragmentary side view of the rear end of the vehicle with parts of the motor drive and bottom conveyor shown in longitudinal section;

Figure 4 is a transverse section taken on line 4—4 of Figure 1;

Figure 5 is a transverse section taken on line 5—5 of Figure 1;

Figure 6 is an enlarged detail section taken generally in horizontal planes through the axis of a drive wheel and the axis of its drive motor;

Figure 7 is a fragmentary detail section showing the inner bearings for the worm drive;

Figure 8 is a fragmentary detail plan view of the operator's station or platform, with parts broken away to show details of the steering and brake control mechanism;

Figure 9 is a fragmentary detail section showing details of the brake control levers on the operator's platform.

Referring now to details of the embodiment of my invention illustrated in the drawings, the vehicle indicated generally at 10 comprises an elongated chassis 11 including a pair of vertically disposed, laterally spaced beams 12, 12 extending the full length of the vehicle and forming the side walls of a coal-carrying compartment indicated at 13. In the form shown herein, each of said beams consists of a relatively heavy plate 14 forming the lower portion thereof, with a lighter plate 15 welded along the top edge of plate 14 to form a vertical extension thereof, as clearly seen in Figures 4 and 5.

The chassis also has two rubber-tired drive wheels 16, 16 near the rear end, mounted on stub axle structures 17, 17, and two rubber-tired steering wheels 18, 18 near the front end, mounted on an equalizing axle structure 19, as will presently be described in detail.

An endless flight conveyor indicated generally at 20 extends along and forms the bottom of the coal-carrying compartment 13 for substantially the full length of the vehicle, so that the coal can be unloaded mechanically from one end thereof, in the usual manner. An operator's platform 21 bearing the vehicle control devices, is provided at one corner of the vehicle outside one of the upright compartment walls 12 thereof and forwardly of the adjacent front wheel 18, as shown in Figures 1 and 2.

The side walls 12, 12 have deck plates 22, 22 extending laterally from their upper edges along opposite sides of the vehicle merging with curved fenders 23 and 24 which form individual wells for the front and rear wheels respectively. Suitable compartments 25, 25 are formed along the outer sides of the side walls 12, 12 between the wheel wells and below the deck plates 22, 22 to provide spaces for storage batteries and electric controller equipment of the usual kind.

The side beams 12 are cross-connected by a plurality of longitudinally spaced angle members 28 and tubular members 29 extending between the upper and lower flights of the conveyor 20. The chassis structure is also stiffened by a bottom plate 30 connecting the bottom edges of the side beams 12, 12 below the lower flight of the conveyor, and a top plate 31 upon which the upper flight of the conveyor is supported.

The stub axle structures 17, 17 for rear wheels 16, 16 each consist of a bracket 33 suitably secured as by bolting to the outer face of a side beam 12. The beam 12 is preferably reinforced at this point by a filler plate 34 welded thereto, and against which the foot of bracket 33 is secured, as shown in Figures 3 and 4. The bracket 33 extends outwardly and upwardly to a horizontal cylindrical bearing 35 which has a stub axle 36 mounted therein. Said axle has a reduced outer end 37 on which is mounted two anti-friction members 38, 39 which rotatably support the wheel hub 40 of wheel 16 (see Figure 6). The wheel 16 may be of any suitable construction, including a demountable rim 41 for a rubber tire 42, carrying a brake drum 43 of the usual construction. In the form shown, however, the inner end of the wheel hub 40 has a flange 44 formed integral therewith, with a drive gear 45 secured thereon as by bolting.

The drive mechanism for the wheel 16 consists of an electric motor 47 in casing 48 disposed longitudinally of the machine above and to the rear of said wheel and having an armature shaft 49 connected by coupling 50 to a worm 51 on worm shaft 52. The worm 51 is meshed with worm gear 53 fixed on stub shaft 54. A pinion 55 is also fixed on said stub shaft 54 and meshes with the drive gear 45 of said wheel.

The entire drive gearing just described is rotatably mounted in and enclosed by a gear casing 57 which is rigidly connected to the front end of the motor casing 48 to move therewith, and is also supported for pivotal rocking movement relative to the axle supporting bracket 33. In the form shown herein, the gear casing 57 has an annular bearing portion 58 rockably mounted on the outer end of the cylindrical bearing member 35 (see Figures 4 and 6), and also has a yoke member 59 secured to its inner face (see Figures 6 and 7), which extends inwardly and is rockably mounted on the inner end of the axle 36. It will be observed that the upper central portion of the bracket 33 is cut away at 61 to accommodate the end yoke 59. The outer portion of the casing 57 which surrounds the drive gear 45 of the wheel is enclosed by a removable cover plate 60.

The rear end of motor casing 48 is supported on the chassis by a suitable yielding cushion means herein consisting of a cross yoke 62 rotatably secured to the rear end of the motor casing and having each of its ends pivotally connected to a supporting rod 63 which passes through a horizontally disposed anchor plate 64 fixed on the chassis. Compression springs 65, 65 are interposed between abutments at the upper and lower ends of said supporting rod and said anchor plate, as shown in Figures 3 and 4.

With the motor supporting structure just described, each of the two motors 47 and their respective gearing connections carried in gear casings 57 are free to accommodate themselves to the various twisting stresses that may be imposed on their respective wheel structures while in operation.

The equalizing axle structure 19 for the front wheels 18, 18 includes an axle member 67 extending transversely of the vehicle between the upper and lower flights of the conveyor 20, and pivotally connected to the chassis at its central point so as to be free for limited rocking motion in a vertical plane. In the form shown herein, a tunnel structure for the axle member 67 is formed by two transverse angle members 69, 70 spaced along on the front and rear, respectively, of said axle and welded at opposite ends to the side plates 12, 12 (see Figures 1, 5 and 8). The upper flanges of said angle members are also secured to the top plate 31 which supports the upper flight of the conveyor 20. The ends of pivot pin 68 are supported in said angle members.

The side plates 12, 12 have openings 71, 71 for the axle 67, and are reinforced by arched pedestal members 72, which are welded to said side plates and form lateral guide surfaces for said axle.

The wheels 18, 18 are swiveled for steering on the usual knuckle joints 73 at opposite ends of the axle 67. Said wheels may be of any suitable heavy duty construction including brake drums 74 and detachable rims 75 for rubber tires 76.

The endless conveyor 20 which extends substantially the full length of the vehicle between the side beams 12, 12 as previously described, is made up of a pair of chains 80, 80 along the sides thereof, cross connected by a plurality of flights 81, 81. The chains are meshed with drive sprockets 82, 82 on shaft 83 at the front or delivery end of the vehicle. Said drive shaft is suitably driven by an electric motor 84 herein mounted on the outer side of one of the side walls 12 of the vehicle opposite the operator's platform 20, and suitably connected to said drive shaft through a worm and worm gear reduction in a casing indicated generally at 85, and a chain and sprocket drive 86 driven by the worm gear of said worm and worm gear reduction (see Figures 1 and 2).

The upper reach of the conveyor 20 passes over and along the horizontal plate 31 which extends between the side walls 12, 12 to define the bottom of the carrying compartment 13. Said conveyor passes over idler sprockets 88, 88 on shaft 89 at the rear end of the vehicle, as shown in Figures 3 and 4. The shaft 89 is rotatably mounted in journal boxes 90, 90 which are mounted for longitudinal adjustment by means of threaded bolts 91, 91 in the usual manner to take up slack in the conveyor.

In the form shown, the rear idler sprockets 88 and shaft 89 are housed beneath a cover plate 93 which extends horizontally across the rear end of the carrying compartment and is arched upwardly at a level somewhat above the level of the conveyor. Said cover plate terminates in an arcuate rear bumper plate 94. This cover plate serves as a protection against the loading boom of a loading machine, when the latter type of machine is used for loading material into the rear end of the vehicle, whereby the loading boom may be extended directly into the rear end of the car and may rest on said cover plate, but will be held above the moving flights of the conveyor so as to avoid damaging the latter.

The chains 80, 80 of the lower flight rest on wear strips 95, 95 fixed along opposite sides of the bottom plate 30. A plurality of guide plates 96, 96 having upwardly angled side margins are fixed on the lower faces of the transverse angle members 28 to prevent fouling by the conveyor chains, as shown in Figure 2.

The vehicle is controlled by drive, steering and brake control members located on the operator's platform 21. Said operator's platform is necessarily of limited size in vehicles of this character, and special precautions are necessary in order to provide maximum safety for the operator because of the fact that he is in a relatively hazardous position at the corner of the vehicle in case of a collision with mine abutments, or similar accidents, while he is operating the vehicle in such a cramped postion and through the relatively narrow spaces available in a mine.

In the form shown, the operator's platform has two seats 97, 98 facing forwardly and rearwardly, respectively, at opposite ends of said platform and including back rests 97ª and 98ª, respectively, made of sheet metal. The arrangement is such that the operator can sit in seat 97 while driving forwardly, and in seat 98 while driving in the reverse direction. In either position his legs will be extended horizontally along the platform toward the opposite seat.

The steering control means consists of a steering wheel 100 on an upright post 101, disposed centrally on the platform 21, but mounted in a casing 102 supported on a laterally offset portion 103 of an upright bracket 104 adjacent the side wall 12, so that said steering wheel and post overhang the platform a substantial distance above the seats 97, 98 and between the latter, as shown in Figures 2 and 5. The casing 102 contains a worm and segment steering mechanism indicated generally at 105, of the kind usually employed in steering devices for operating a horizontal shaft 105ᵃ rotatably mounted in the offset bracket portion 103 and having a rocking arm 106 depending from its inner end through an arcuate slot 107 in the upright bracket 104. The lower end of the rocking arm 106 has a drag link 108 pivotally connected thereto, which extends rearwardly to the steering arm 109 of the adjacent front wheel 18 (see Figure 8).

The two front wheels are connected for simultaneous steering by suitable tie rod means, herein consisting of a pair of pivoted links 110, 110 connected at their outer ends to lever arms 111, 111, and at their inner ends to a rocker link 112 pivotally connected to adjacent cross member 28 as shown in Figure 1.

With the steering arrangement thus described, it will be observed that the space immediately beneath the steering wheel 100 is fully open to the outer side of the platform 21 so that the operator may slide laterally into either seat 97 or 98 with his legs extending beneath the steering post. Thus the operator is enabled to mount or dismount the vehicle much more readily than with previous constructions wherein the steering post extended to the floor, and it was necessary for him to hook one leg on the inside of the steering post while seated on the platform. This feature which affords laterally-open leg room is of especial advantage in an emergency as it permits the operator to slide out of his seat far more readily than if one of his legs were hemmed in by an upright steering post, as in former constructions.

Dual control devices are provided for the wheel brakes, herein including two foot levers 115 and 116, pivotally mounted on the upright posts 117 and 118, respectively, disposed at the right-hand corners of the seats 97 and 98 (see Figures 5 and 8). Said foot levers extend horizontally outwardly and inwardly, respectively, below the front ends of their respective seats 97 and 98, and with their outer ends extending beyond the offset side edge of its respective seat, in position to be engaged by the right foot of the operator when he is seated in the opposite seat.

Suitable connecting means are provided so that either of the foot levers 115 and 116 will operate a master cylinder 120 of the usual kind connected to the hydraulic brake control system of the vehicle. In the form shown, said connecting means includes an operating rod 121 connected to a lever arm 122 on a shaft 123 extending transversely of the operator's platform and rotatably mounted in brackets 124, 124 at opposite ends thereof. One of the foot levers 115 is connected to the shaft 123 by a link 125 and lever arm 126, while the other foot lever 116 is connected to said cross shaft 123 by a link 127 and a lever arm 128. It will be observed that the connecting link 125 is pivoted to an extended portion 115ᵃ of foot lever 115, while the link 127 is pivoted to an intermediate portion of the other foot lever 116, so that operation of either foot lever will tend to rock the cross shaft 123 in the same direction, that is to say, in a direction tending to move the link 121 toward the master cylinder 120. Suitable spring means 129 are provided to return the foot levers to released position.

In the form shown herein, lost motion means is also provided between the links 125 and 127 and the cross shaft 123 so that operation of one of the foot levers will not cause operation of the other. In the form shown, said lost motion means is provided by forming the ends of the links 125 and 127 with elongated slots 125ᵃ and 127ᵃ, respectively, within which the pivoted pins 126ᵃ and 128ᵃ of the respective lever arms 126 and 128 have slidable engagement. With this arrangement, when the foot lever 115 is pressed rearwardly to operate the master cylinder 120, the other foot lever 116 will not be affected. Similarly, when the foot lever 116 is depressed, the opposite foot lever 115 will remain in fixed position.

It will be observed, however, that the two foot levers 115 and 116 are each in position to serve as an emergency hand lever, so that the operator when sitting, for instance, in seat 97 may operate the lever 116 by pushing with his right foot and at the same time operate the lever 115 by pulling it toward him with his left hand. Similarly, while sitting in seat 98 he can operate lever 115 with his right foot and at the same time operate lever 116 with his left hand. This feature is of especial advantage as a safety measure, if for any reason the operator may be unable to operate the foot lever in the usual manner, or may require additional braking effort in an emergency.

Dual controls may also be provided for the driving motors as for instance by means of a pair of foot levers 130, 131, herein shown as mounted on the posts 117 and 118 above the driver's seats 97 and 98, respectively. Said control levers may be connected to a common controlling device in any suitable manner, not shown herein in detail as it forms no part of the present invention.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a vehicle for transporting loose material, a frame consisting of a pair of laterally spaced vertical walls forming the principal longitudinal supporting members of said frame, an endless conveyor supported on said frame between said walls and forming the bottom of a material-carrying compartment arranged to discharge material at one end of the vehicle, a pair of wheels at opposite sides of said vehicle, and individual supporting means for said wheels each comprising a bracket secured to the outer face of its adjacent side wall, and a plurality of upright reinforcing cross braces extending between the upper and lower flights of said endless conveyer, and rigidly connecting the inner faces of said side walls immediately adjacent said supporting brackets.

2. In a vehicle for transporting loose material, a main frame consisting of a pair of laterally spaced vertical walls forming the principal longitudinal supporting members of said main frame, an endless conveyor supported on said main frame between said walls and forming the bottom of a material-carrying compartment arranged to discharge material at one end of the vehicle, a pair of wheels at opposite sides of said vehicle, supporting brackets for said wheels secured to the outer face of its adjacent side wall, and an independent drive mechanism for each of said wheels including a motor and gear reduction mechanism supported as a unit on a frame member outside of said wall, and having rocking engagement on its respective supporting bracket concentrically with the axis of its respective wheel, said motor and reduction gear unit also being yieldably connected to the main frame at a point remote from its rocking engagement with said bracket.

WILLIAM R. BECK.